United States Patent [19]

Watanabe et al.

[11] Patent Number: 5,552,083
[45] Date of Patent: Sep. 3, 1996

[54] SOL AND FINE POWDER OF SODIUM MAGNESIUM FLUORIDE AND PROCESSES FOR THEIR PRODUCTION

[75] Inventors: Yoshitane Watanabe; Keitaro Suzuki; Yoshinari Koyama; Motoko Iijima, all of Funabashi, Japan

[73] Assignee: Nissan Chemical Industries Ltd., Tokyo, Japan

[21] Appl. No.: 293,207

[22] Filed: Aug. 19, 1994

[30] Foreign Application Priority Data

Aug. 31, 1993 [JP] Japan .................................. 5-216252

[51] Int. Cl.$^6$ ................................ B01J 13/00; C01B 9/08
[52] U.S. Cl. ....................... 252/309; 252/313.1; 252/314; 423/464; 106/286.2
[58] Field of Search ................................ 252/309, 313.1, 252/584, 314; 423/158, 161, 163, 464; 106/286.1, 286.2, 286.6, 286.8

[56] References Cited

U.S. PATENT DOCUMENTS

| | | | |
|---|---|---|---|
| 2,659,658 | 11/1953 | LaLande, Jr. et al. | 423/464 |
| 2,877,095 | 3/1959 | Anderson | 423/161 |
| 2,985,508 | 5/1961 | Fredrickson et al. | 423/161 |
| 3,238,015 | 3/1966 | Pessahovitch et al. | 423/464 |

FOREIGN PATENT DOCUMENTS

| | | |
|---|---|---|
| 223703 | 12/1957 | Australia . |
| 1467259 | 1/1969 | Germany . |
| 1467258 | 3/1969 | Germany . |
| 2-026824 | 1/1990 | Japan . |
| 567260 | 2/1945 | United Kingdom . |

OTHER PUBLICATIONS

*Chemical Engineer's Handbook*, Perry et al. (McGraw–Hill, Inc, NY, NY, 1973) pp. 8–8 to 8–13.
Patent Abstracts of Japan, vol. 14, No. 180 (C–0708), Apr. 11, 1990; Chemical Abstracts, vol. 113, No. 12, Sep. 17, 1990, 100411E, Derwent Abstracts, 90–072442, of JP–A–02 026 824.
Handbook of Chemistry and Physics, 68th Edition, p. F–74 CRC Press, Boca Roton, FL (1988).

*Primary Examiner*—Richard D. Lovering
*Assistant Examiner*—Daniel S. Metzmaier
*Attorney, Agent, or Firm*—Oblon, Spivak, McClelland, Maier & Neustadt, P.C.

[57] ABSTRACT

A sol comprising colloidal particles of sodium magnesium fluoride ($NaF \cdot MgF_2$) having an average particle diameter of from 10 to 100 nm.

12 Claims, No Drawings

SOL AND FINE POWDER OF SODIUM MAGNESIUM FLUORIDE AND PROCESSES FOR THEIR PRODUCTION

The present invention relates to a sol and a fine powder of sodium magnesium fluoride useful for a coating material for an anti-reflection coating for e.g. lenses or cathode ray tubes or image display surfaces of liquid crystal display devices, useful for a laser window material, or useful for a laser optical element, and processes for their production.

It is common to apply anti-reflection treatment to lenses or to cathode ray tubes or to image display surfaces of liquid crystal display devices for the purposes of reducing reflection of exterior lights such as sunlight or electric light and increasing the transmittance of lights. The anti-reflection treatment is carried out usually by a vacuum deposition method or by a coating method, and as the outermost layer, magnesium fluoride or silica having a low refractive index is, for example, used. It is known that a sol or a fine powder of magnesium fluoride is particularly effective as a microfiller for an anti-reflection coating agent. However, magnesium fluoride particles have a drawback that the dispersibility is poor, and the desired transparency can not be obtained unless the diameter of primary particles is substantially reduced. The productivity will be poor to attain such a small diameter for primary particles.

The following process has been reported as a process for producing a sol and a fine powder of magnesium fluoride. Namely, Japanese Unexamined Patent Publication No. 124332/1988 proposes a process for producing an acidic aqueous dispersion of colloidal particles of magnesium fluoride by adding an aqueous hydrofluoric acid solution to an aqueous solution of a mixture of magnesium acetate and polyvinyl alcohol. The aqueous dispersion of colloidal particles obtained by this process has pH2 and has a drawback that at a concentration of 5 wt % or higher, it immediately undergoes gelation after its preparation.

Japanese Unexamined Patent Publication No. 41149/1989 proposes a method for preventing reflection by coating on a screen panel of a cathode ray tube a sol composed of fine particles of magnesium fluoride having a particle diameter of from 100 to 200 Å. However, there is no report on the method for producing this sol.

Japanese Unexamined Patent Publication No. 26824/1990 discloses an aqueous or organo sol of magnesium fluoride having a light transmittance of at least 50%, and a product with a coating film formed by coating and drying this sol on a substrate surface, as well as a process for producing an aqueous magnesium fluoride sol, which comprises reacting an aqueous magnesium salt-solution and an aqueous fluoride solution by a simultaneous addition method to form a geled precipitate, heating and aging the obtained reaction solution and then removing an electrolyte in the solution. The colloidal particles of magnesium fluoride obtained by this process have a remarkably small particle diameter at a level of from 100 to 120 Å.

On the other hand, with respect to sodium magnesium fluoride ($NaF \cdot MgF_2$), "A Comprehensive Treatise on Inorganic and Theoretical Chemistry" by Mellor discloses that crystals of sodium magnesium fluoride can be obtained by boiling a mixture of an aqueous sodium fluoride solution and magnesium hydroxide.

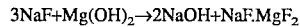

$$3NaF + Mg(OH)_2 \rightarrow 2NaOH + NaF \cdot MgF_2$$

However, there is no report on colloidal particles of sodium magnesium fluoride or on an anti-reflection coating agent employing such colloidal particles.

The colloidal particles of magnesium fluoride have little bond strength by themselves. Accordingly, an organic or inorganic binder is required, when they are to be used as an anti-reflection coating agent. In such a case, if the primary particle diameter is small, a large amount of the binder will be required, whereby it tends to be difficult to obtain the desired refractive index. Therefore, a fluoride sol free from the above drawbacks, which has a refractive index lower than magnesium fluoride, and a method for its production, are desired.

According to "Handbook of Chemistry and Physics (1970–1971 51st edition)", the refractive index of sodium fluoride is 1,327, which is lower than the refractive index (1.378–1.390) of magnesium fluoride, but sodium fluoride is soluble in water, whereby it is very difficult to obtain its fine particles or sol.

It is an object of the present invention to provide a novel fine powder, an aqueous sol or an organo sol of sodium magnesium fluoride useful for an anti-reflection film to reduce reflection of exterior lights or to increase light transmittance, and processes for producing them.

The present invention provides a sol comprising colloidal particles of sodium magnesium fluoride ($NaF \cdot MgF_2$) having an average particle diameter of from 10 to 100 nm.

The sodium magnesium fluoride sol of the present invention is a sol in which colloidal particles of sodium magnesium fluoride ($NaF \cdot MgF_2$) are dispersed in water and/or an organic solvent.

The process for producing an aqueous sol of sodium magnesium fluoride of the present invention comprises (a) a step of mixing an aqueous sodium fluoride solution and an aqueous magnesium salt solution in a Na/Mg molar ratio of 3.0 to form a slurry of aggregates of colloidal particles of sodium magnesium fluoride, (b) a step of removing by-product salts in the slurry of aggregates of colloidal particles of sodium magnesium fluoride obtained in the step (a), and (c) a step of wet-pulverizing the slurry of aggregates of colloidal particles of sodium magnesium fluoride obtained in the step (b).

The magnesium salt to be used in the present invention is preferably a salt soluble in water, such as magnesium chloride, magnesium nitrate, magnesium sulfate, magnesium sulfamate, magnesium acetate or magnesium formate. Such salts may be used alone or in combination as a mixture of two or more of them.

In the present invention, it is preferred to mix the aqueous sodium fluoride solution and the aqueous magnesium salt solution in the step (a) so that the Na/Mg molar ratio will be 3.0. Mixing of the aqueous sodium fluoride solution and the aqueous magnesium salt solution can be carried out by adding the aqueous magnesium salt solution to the aqueous sodium fluoride solution, adding the aqueous sodium fluoride solution to the aqueous magnesium salt solution, or adding the two aqueous solutions simultaneously so that the magnesium salt and sodium fluoride always maintain the stoichiometric amounts for forming sodium magnesium fluoride. However, in order to avoid a side reaction to form magnesium fluoride, it is preferred to add the aqueous magnesium salt solution to the aqueous sodium fluoride solution. In the present invention, the aqueous sodium fluoride solution and the aqueous magnesium salt solution in the step (a) can be mixed within a temperature range of from 0° to 100° C. by means of an apparatus such as a Satake type mixer, a Pfaudler type mixer, a disper or a homogenizer. it is particularly preferred to conduct the mixing within a temperature of from 0° to 60° C. to obtain an average particle diameter of from 10 to 100 nm. The time for addition under stirring may be from 0.1 to 10 hours. The concentration of sodium magnesium fluoride formed in the step (a) is preferably adjusted to a level of from 0.1 to 5.0 wt %, preferably from 0.2 to 2 wt %, as $NaF.MgF_2$.

By the step (a), aggregates of colloidal particles of sodium magnesium fluoride having an average particle diameter of from 10 to 100 nm will form and become a slurry. When this slurry is left to stand still, aggregates of colloidal particles of sodium magnesium fluoride will precipitate.

In the step (a), by-product salts will form in addition to the desired colloidal particles of sodium magnesium fluoride. Such by-product salts are formed from anions of the magnesium salt and sodium ions derived from sodium fluoride. For example, a salt such as sodium chloride will form as a by-product.

In the step (b) of the present invention, such by-product salts are removed. As a method for removing the by-product salts, it is possible to employ, for example, a filtration method by means of e.g. a filter press, a membrane filtration method by means of e.g. an ultrafiltration membrane or a reverse osmotic membrane, an ion exchange method or a static sedimentation separation method. Among them, a membrane filtration method employing an ultrafiltration membrane is most preferred. If necessary, the membrane filtration method may be used in combination with the above-mentioned another method. Especially by means of a tubular ultrafiltration membrane, it is possible to effectively remove the by-product salts.

With respect to the temperature, the step (b) can be carried out usually at a temperature of from 0° to 80° C., although it depends also on the material of the ultrafiltration membrane. The higher the temperature, the higher the filtration speed and the better the cleaning efficiency, but fine colloidal particles tend to bond to one another. Therefore, the temperature is preferably from 0° to 60° C. To adequately remove the salts, it is necessary to carry out the filtration while continuously or intermittently pouring water. The time for the filtration is not particularly limited, but is usually from 1 to 50 hours.

Among aggregates of colloidal particles of sodium magnesium fluoride, some aggregates which have been aggregated due to the by-product salts, become small and form an aqueous sol by the removal of by-product salts in the step (b). However, the majority of aggregates can not be converted to a sol by mere removal of the salts and will remain in the form of aggregates.

In the step (c), the slurry of aggregates of colloidal particles of sodium magnesium fluoride containing substantially no salts obtained in the step (b) of the present invention, is wet-pulverized by a method employing e.g. a ball mill, a sand grinder, an attriter or a homogenizer, to obtain an aqueous sol of sodium magnesium fluoride.

The concentration of sodium magnesium fluoride in the step (c) is usually from 2 to 50 wt %, preferably from 5 to 50 wt %, as $NaF.MgF_2$. The higher the concentration, the better.

The step (c) can be carried out at a temperature of from 0° to 80° C. However, if the temperature becomes high, bonding of fine colloidal particles is likely to occur. Therefore, the temperature is preferably from 0° to 60° C. The pulverization time is usually from 0.1 to 100 hours, although it depends on the pulverization method.

In the step (c), the particles of sodium magnesium fluoride can be made to have an average particle diameter of from 10 to 100 nm, as observed by an electron microscope. Non-pulverized or inadequately pulverized particles can be removed by e.g. a centrifugal separation method, a static sedimentation separation method or a filtration method, as the case requires.

In the step (e) of the present invention, it is possible to obtain an organo sol by substituting an organic solvent for the water of the aqueous sol of sodium magnesium fluoride obtained in the step (c) by a conventional method under reduced pressure or under atmospheric pressure. As the organic solvent to be used in the present invention, methanol, ethanol, isopropanol, n-propanol, DMF, DMAC, ethylene glycol or propyl cellosolve may, for example, be mentioned. These organic solvents may be used alone or in combination as a mixture of two or more of them. The temperature for substitution of the solvent varies depending upon the boiling point of the solvent. However, it is preferred to carry out the substitution at a temperature as low as possible under reduced pressure. The substitution of the solvent can be conducted for from 0.5 to 100 hours.

In the step (f) of the present invention, it is possible to obtain an organo sol of sodium magnesium fluoride by drying the slurry of aggregates of colloidal particles of sodium magnesium fluoride containing substantially no salts obtained in the step (b), and then dispersing the obtained sodium magnesium fluoride powder in an organic solvent, followed by wet-pulverization. This wet-pulverization is preferably conducted at a temperature of not higher than the boiling point of the solvent, and the temperature is preferably as low as possible. The pulverization time may usually be from 0.1 to 100 hours.

The concentration of the organo sol of sodium magnesium fluoride obtained in the step (e) or (f) of the present invention is usually from 2 to 40 wt % as $NaF.MgF_2$. With respect to the particle size, the average particle diameter is usually from 10 to 100 nm, as observed by an electron microscope.

The fine powder of sodium magnesium fluoride of the present invention has a feature that it is composed of colloidal particles of sodium magnesium fluoride (NaF.MgF2) having an average particle diameter of from 10 to 100 nm.

The process for producing the fine powder of sodium magnesium fluoride of the present invention comprises drying in the step (d) the aqueous sol of sodium magnesium fluoride produced by the above-mentioned steps (a), (b) and (c).

The drying operation in the step (d) can be carried out by means of a dryer such as a spray dryer, a drum dryer, a fluidized bed dryer, a vacuum dryer, a freeze dryer or a hot air dryer, to obtain the fine powder of sodium magnesium fluoride. Further, if necessary, the dried fine powder may be subjected to dry-pulverization by a Jet-O-Mizer, a pin disk mill or a mixer.

Further, in the present invention, an organo sol can be obtained also by dispersing the fine powder of sodium magnesium fluoride obtained in the step (d) in an organic solvent.

Each of the aqueous sol of sodium magnesium fluoride obtained in the step (c) of the present invention and the organo sol obtained in the step (e) or (f) has a light transmittance of at least 30 at a concentration of 5 wt % as $NaF.MgF_2$. This light transmittance represents a relative value of the transmittance of light with a wavelength of 500 nm through a sodium magnesium fluoride sol with a thickness of 1 cm, relative to the transmittance of light with the same wavelength through water with a thickness of 1 cm being 100.

As a result of powder X-ray diffraction of the sodium magnesium fluoride obtained by the process of the present invention, the X-ray diffraction peaks completely agreed to the sodium magnesium fluoride (NaMgF$_3$, namely NaF.MgF$_2$, ASTM No. 13-303) disclosed in ASTM (Index to the X-ray Powder Data File Inorganic), and no other peaks of e.g. magnesium fluoride were observed. Further, as a result of the differential thermal analysis (DTA-TG analysis) of the sodium magnesium fluoride thus obtained, no remarkable weight reduction was observed, and the product was confirmed to be anhydrous. From these results, the sodium magnesium fluoride of the present invention was determined to have a composition of NaF.MgF$_2$.

With respect to the sizes of colloidal particles of sodium magnesium fluoride of the present invention, the average particle diameter is from 10 to 100 nm as observed by an electron microscope. Those having an average particle diameter of more than 100 nm are undesirable since they exceed 100 nm which is an effective thickness as an anti-reflection film. When the aqueous sodium fluoride solution and the aqueous magnesium salt solution are mixed in the step (a) in the present invention, the Na/Mg molar ratio may be less than 3.0, but such is not advisable, since the formation ratio of sodium magnesium fluoride tends to be low. Likewise, the desired sodium magnesium fluoride can be obtained at a molar ratio of more than 3.0, but such is not advisable since magnesium fluoride is likely to form as a by-product.

When the aqueous sodium fluoride solution and the aqueous magnesium salt solution are mixed in the step (a) of the present invention so that the Na/Mg molar ratio will be 3.0, it is possible to employ one mol of sodium fluoride and 2 mols of hydrofluoric acid and/or ammonium fluoride, instead of 3 mols of sodium fluoride. However, such is not advisable, since dissolution of sodium magnesium fluoride is likely to occur, or the yield tends to be poor.

In the step (a), if the reaction is conducted at a temperature exceeding 100° C., the particle size of the resulting sodium magnesium fluoride tends to be large, such being undesirable. The reaction time in the step (a) may be less than 0.1 hour, but such is not advisable, since mixing tends to be inadequate. Likewise, the reaction time may be more than 10 hours, but such is not advisable, since the production time will be unnecessarily long.

The concentration of sodium magnesium fluoride in the step (a) may be less than 0.1 wt % as NaF.MgF$_2$, but such is not efficient. Likewise, the concentration may be higher than 5 wt %, but such is not advisable, since the particle size tends to be too large.

The time for the step (b) varies depending upon whether the operation is continuous or intermittent. The total time may be more than 50 hours, but such is not advisable, since the production time will be unnecessarily long.

The time for the step (c) may be more than 100 hours, but such is not advisable, since the production time will unnecessarily be long.

The time required for substitution of the solvent in the step (e) may be more than 100 hours, but such is not advisable, since the production time will unnecessarily be long.

The time for the wet-pulverization after drying the slurry of aggregates of colloidal particles of sodium magnesium fluoride obtained in the step (b) and then dispersing it in an organic solvent, in the step (f), may be more than 100 hours, but such is not advisable, since evaporation of the solvent tends to be too much, and the production time will be unnecessarily long.

In the present invention, the concentration of the aqueous sol or the organo sol of sodium magnesium fluoride obtained in the step (c), (e) or (f), may be less than 2 wt %, but such is not advisable, since it tends to be thinner when it is used as mixed with another binder. Likewise, it is possible to obtain an aqueous sol of sodium magnesium fluoride having a concentration exceeding 50 wt % or an organo sol of sodium magnesium fluoride having a concentration exceeding 40 wt %, but such is not advisable, since the viscosity of the sol tends to be high.

In the present invention, sodium magnesium fluoride has a refractive index lower than magnesium fluoride and it is insoluble in water. Therefore, by obtaining fine particles or a sol of sodium magnesium fluoride, such fine particles and/or sol may be used as a coating agent for a lens or a cathode ray tube or an image display surface of a liquid crystal display device, whereby an excellent anti-reflection effect can be obtained.

Now, the present invention will be described in further detail with reference to Examples. However, it should be understood that the present invention is by no means restricted by such specific Examples.

EXAMPLE 1

Step (a).

2268 g of sodium fluoride (NaF, guaranteed reagent, manufactured by Kanto Kagaku) was dissolved in 100 l of pure water to obtain 102.3 kg of an aqueous sodium fluoride solution. The concentration of sodium fluoride in this aqueous solution was 2.22 wt %. On the other hand, 3654 g of magnesium chloride (MgCl$_2$.6H$_2$O, guaranteed reagent, manufactured by Kosou Kagaku) was dissolved in 100 l of pure water to obtain 103.7 kg of an aqueous magnesium chloride solution. The concentration of magnesium chloride (MgCl$_2$) in this aqueous solution was 1.65 wt %.

The above aqueous sodium fluoride solution was charged into a 300 l container. While strongly stirring it with a disper, the above-mentioned aqueous magnesium chloride solution was added thereto at room temperature over a period of 30 minutes, and then stirring was further continued for one hour. Then, the reaction was terminated to obtain 206 kg of a slurry of colloidal particles of sodium magnesium fluoride. The reaction is represented by the following formula:

$$3NaF + MgCl_2 \rightarrow NaF.MgF_2 + 2NaCl$$

The above-mentioned sodium fluoride and the magnesium chloride were in a Na/Mg molar ratio of 3.0. The slurry of colloidal particles of sodium magnesium fluoride thus obtained was partially in the form of a sol, but when it was left to stand still, the particles sedimented to form aggregates of colloidal particles of sodium magnesium fluoride. The concentration of sodium magnesium fluoride in this slurry was 0.91 wt %. This slurry had pH 4.43 and an electrical conductivity of 16.0 ms/cm. When the slurry was subjected to centrifugal separation to remove the aggregates of colloidal particles of sodium magnesium fluoride, and the sodium concentration in the (transparent) supernatant was 4060 ppm. This concentration agreed to the concentration of by-product NaCl as theoretically calculated.

Step (b)

206 kg of the slurry of aggregates of colloidal particles of sodium magnesium fluoride obtained in the step (a) was subjected to filtration using a tubular ultrafiltration apparatus [UF(PS-150), manufactured by Mitsubishi Rayon Engineering Co., Ltd.] while adding 420 kg of pure water at the same rate as the ultrafiltration rate. The liquid temperature was 25° C., and the filtration time was 15.5 hours. The concentration at the time of the filtration was about 3.0 wt % as $NaF.MgF_2$. After the filtration, the slurry was concentrated by the ultrafiltration apparatus to obtain 6170 g of a slurry of aggregates of colloidal particles of sodium magnesium fluoride containing substantially no salts. The slurry of aggregates of colloidal particles of sodium magnesium fluoride thus obtained in this step (b) had sodium magnesium fluoride concentration ($NaF.MgF_2$ concentration) of 28.0 wt % and an electrical conductivity of 870 µs/cm, and it showed a tendency for separation when left to stand still. The yield of sodium magnesium fluoride was about 92%.

Step (c)

500 g of glass beads (diameter: 1.5 mm, made of soda lime glass) were added to 670 g of the slurry of aggregates of colloidal particles of sodium magnesium fluoride containing substantially no salts obtained in the step (b), and pulverization was carried out at room temperature for 4 hours by a batch-system sand grinder at a rotational speed of 2000 rpm under cooling. After completion of the pulverization, the glass beads were separated to obtain 1250 g of an aqueous sol of sodium magnesium fluoride. This aqueous sol of sodium magnesium fluoride had the concentration lowered as compared prior to the pulverization because of cleaning of the beads with pure water.

This aqueous sol of sodium magnesium fluoride had a specific viscosity of 1.106, a pH of 7.05, a viscosity of 3.8 mPa.s, a sodium magnesium fluoride ($NaF.MgF_2$) concentration of 15.0 wt % and an electrical conductivity of 492 µs/cm. This sol was stable although slight precipitate was observed when it was left to stand at room temperature for one month. Further, the light transmittance of this sol (5 wt % as $NaF.MgF_2$) was 48.5%. As a result of the electron microscopic observation, the colloidal particles of sodium magnesium fluoride were spherical to rod-shaped, and the particle diameters were from 10 to 150 nm. The average particle diameter obtained by the image analysis of the electron microscopic photograph, was 52 nm. Further, the particle diameter in a liquid as measured by a dynamic light-scattering method was 204 nm. The particle diameter by the dynamic light-scattering method was measured by a commercially available $N_4$ apparatus manufactured by Coulter Co. in U.S.

EXAMPLE 2

An aqueous sol of sodium magnesium fluoride ($NaF.MgF_2$ concentration: 15 wt %) obtained in the same manner as in the step (c) of Example 1, was dried by a freeze drying method as the step (d) to obtain a fine powder of sodium magnesium fluoride. This fine powder had a particle diameter of 1.0 µm as measured in a non-solvent, but it was readily dispersed in water or an alcohol.

Further, this fine powder of sodium magnesium fluoride obtained in the step (d) was again dispersed in water to obtain an aqueous sol, which was inspected by an electron microscope, whereby the average particle diameter was 60 nm.

With this fine powder of sodium magnesium fluoride obtained in the step (d), the refractive index was measured by an immersion method, whereby the refractive index of this fine powder was 1.370.

EXAMPLE 3

1250 g of the aqueous sol of sodium magnesium fluoride ($NaF.MgF_{2:187.5}$ g) obtained in the step (c) in Example 1, was firstly concentrated to 625 g ($NaF.MgF_2$ concentration: 30 wt %) by a rotary evaporator and then subjected to a solvent substitution at a liquid temperature of from 20° to 40° C. under reduced pressure while continuously charging about 7 l of isopropyl alcohol, as the step (e), to obtain 1870 g of an isopropyl alcohol sol of sodium magnesium fluoride. The time for substitution was 7 hours, and the concentration of sodium magnesium fluoride at the time of substitution was from 10 to 30 wt %. The obtained isopropyl alcohol sol of sodium magnesium fluoride had a specific gravity of 0.846, a pH of 7.20 when diluted with water to 1+1, a viscosity of 8.0 mPa.s, a sodium magnesium fluoride concentration of 10.2 wt % and a water content of 0.10 wt %. Further, the light transmittance of this isopropyl alcohol sol (5 wt % as $NaF.MgF_2$) was 65.4%. The average particle diameter was 52 nm as observed by an electron microscope, and the particle diameter as measured by a dynamic light-scattering method was 204 nm.

This isopropyl alcohol sol of sodium magnesium fluoride obtained in the step (e) was stable without gelation or increase of the viscosity although a very small amount of precipitate was observed when left to stand still at room temperature for one month.

This isopropyl alcohol sol of sodium magnesium fluoride obtained in the step (e) was dried at 100° C. to obtain a fine powder, and the refractive index of the fine powder was measured by an immersion method, whereby the refractive index of this fine powder was 1.370.

EXAMPLE 4

335 g of the slurry of aggregates of colloidal particles of sodium magnesium fluoride containing substantially no salts obtained in the step (b) in Example 1, was dried in a hot air dryer of 110° C. as the step (f) to obtain 93.8 g of a powder of sodium magnesium fluoride. This powder was put into a glass ball mill container, and 218.9 g of methanol was added thereto. Further, 250 g of glass beads ($\phi$1.5 mm, made of soda lime glass) were added, and the container was sealed, followed by pulverization at a rotational speed of 300 rpm at room temperature for 48 hours. After completion of the pulverization, the glass beads were separated and washed with methanol to obtain 938 g of a methanol sol of sodium magnesium fluoride. This methanol sol of sodium magnesium fluoride had a specific gravity of 0.858, a pH of 7.48 when diluted with water to 1+1, a viscosity of 5.0 mPa.s and a sodium magnesium fluoride concentration of 10.0 wt %. The particles had spherical to rod shapes as observed by an electron microscope. The particle diameters were from 10 to 150 nm, and the average particle diameter was 65 nm. Further, the light transmittance of this sol ($NaF.MgF_2$: 5 wt %) was 60.0%, and the particle diameter as measured by a dynamic light-scattering method was 250 nm.

This methanol sol of sodium magnesium fluoride obtained in the step (f) was stable without gelation or increase of the viscosity although a very small amount of precipitate was observed when left to stand still at room temperature for one month.

This methanol sol of sodium magnesium fluoride obtained in the step (f), was dried at 100° C. to obtain a fine powder, and the refractive index of the fine powder was measured by an immersion method, whereby the refractive index of this fine powder was 1.370.

EXAMPLE 5

208 g of ethyl silicate 28 (manufactured by Corcoat K.K.) was dissolved in 600 g of isopropyl alcohol, and a mixed solution comprising 300 g of isopropyl alcohol, 1 g of oxalic acid and 90 g of water, was added thereto over a period of 30 minutes at room temperature with stirring. Then, mixture was heated for 2 hours under reflux at 78° C. to obtain an ethyl silicate type thin filming agent ($SiO_2$ concentration: 5 wt %).

To 160 g of the ethyl silicate type thin filming agent, 226 g of the isopropyl alcohol sol of sodium magnesium fluoride (10 wt % as $NaF \cdot MgF_2$) obtained in the step (e) in Example 3 was added with stirring to obtain 386 g of an anti-reflection coating agent. This coating agent had a solid content of 7.9 wt %, and the weight ratio of sodium magnesium fluoride/$SiO_2$ was 2.83.

This coating agent was diluted with isopropyl alcohol to about 3 times and coated on a glass sheet (soda lime) by a bar coater, followed by drying at 110° C. for 30 minutes to form an anti-reflection coating film. The film thickness was about 0.1 μm. The transmittance of this glass sheet was measured at a wavelength of 550 nm, whereby the transmittance of this anti-reflection treated glass sheet was 94.05, while the transmittance of the non-treated glass sheet was 91.61, thus indicating excellent anti-reflection effects.

EXAMPLE 6

The isopropyl alcohol sol of sodium magnesium fluoride obtained in the step (e) in Example 3 was applied by itself without using an ethyl silicate type thin filming agent on a glass sheet for anti-reflection treatment in the same manner as in Example 5, whereupon the transmittance was measured. As the result, the transmittance was 94.46, thus indicating excellent anti-reflection effects.

COMPARATIVE EXAMPLE 1

1218 g of magnesium chloride ($MgCl_2 \cdot 6H_2O$, guaranteed reagent, manufactured by Kosou Kagaku) was dissolved in 35 kg Of pure water to obtain 36.22 kg of an aqueous magnesium chloride solution. The concentration of magnesium chloride ($MgCl_2$) in this aqueous solution was 1.58 wt %.

On the other hand, 513 g of acidic ammonium fluoride ($NH_4F \cdot HF$, guaranteed reagent, manufactured by Morita Kagaku) was dissolved in 35 kg of pure water, and 185 g of 28% aqueous ammonia and then 242 g of flake-form sodium hydroxide (99 wt % as NaOH) were added thereto to obtain 35.94 kg of an aqueous solution of a mixture of ammonium fluoride and sodium fluoride. In this aqueous solution, the concentration of ammonium fluoride ($NH_4F$) was 1.24%, and the concentration of sodium fluoride (NaF) was 0.70 wt %.

The above-mentioned aqueous magnesium chloride solution was charged into a 150 l container, and while vigorously stirring it with a disper, the above-mentioned mixed aqueous solution of ammonium fluoride and sodium fluoride, was added at room temperature over a period of 20 minutes. Further, stirring was continued for one hour. Then, the reaction was terminated to obtain 72.16 kg of a slurry.

In the above reaction, the ratio of sodium to magnesium was in a Na/Mg molar ratio of 1.0. Further, the ratio of the total molar amount of sodium and ammonium to magnesium was in a ($Na+NH_4$)/Mg molar ratio of 3.0. 7220 g of this slurry was subjected to filtration for about 50 hours by a flat membrane type ultrafiltration apparatus while intermittently adding 20 l of pure water, to obtain 1180 g of a slurry. This slurry had a pH 5.90, an electrical conductivity of 650 μs/cm and a solid content of 3.40% as dried at 150° C. The yield of this reaction was 64% which is close to the theoretical yield of magnesium fluoride of 60%. The results of the X-ray diffraction of the dried powder showed peaks of magnesium fluoride, and the peak of sodium magnesium fluoride was small. Namely, it was confirmed that the desired sodium magnesium fluoride can not be obtained by the above reaction.

The aqueous sol and the organo sol of sodium magnesium fluoride of the present invention are dispersions of colloidal particles of sodium magnesium fluoride having an average particle diameter of from 10 to 100 nm as observed by an electron microscope, and the colloidal particles show excellent dispersibility. The dried product of this sodium magnesium fluoride sol shows a low refractive index at a level of 1.370, and the dried coating film shows excellent light transmittance. Accordingly, this sol may be used alone or in combination with an organic solvent solution of an organic resin of e.g. methyl methacrylate, an emulsion of an organic resin of e.g. acrylic type or acrylstyrene type, an aqueous solution of a water-soluble polymer such as polyvinyl alcohol, a partially hydrolyzed solution of a silane coupling agent, a partially hydrolyzed solution of ethyl silicate or other binder such as silica sol, so that an excellent anti-reflection coating film can be formed by coating it on a glass lens, a plastic lens, a glass sheet, a transparent plastic sheet, a transparent plastic film, a cathode ray tube or an image display surface of a liquid crystal display apparatus, or a color filter.

We claim:

1. A process for producing a sol of sodium magnesium fluoride, which comprises the following steps (a), (b) and (c):

(a) a step of mixing an aqueous sodium fluoride solution and an aqueous magnesium salt solution in a Na/Mg molar ratio of 3.0 to form a slurry of aggregates of colloidal particles of sodium magnesium fluoride, (b) a step of removing by-product salts contained in the slurry of aggregates of colloidal particles of sodium magnesium fluoride obtained in the step (a), and (c) a step of wet-pulverizing the slurry of aggregates of colloidal particles of sodium magnesium fluoride obtained in the step (b);

thereby forming a sol comprising colloidal particles of sodium magnesium fluoride ($NaF \cdot MgF_2$) having an average particle diameter of from 10 to 100 nm.

2. A process for producing a sol of sodium magnesium fluoride as defined in claim 1, further comprising the following step (e):

(e) a step of substituting an organic solvent for the water of the aqueous sol of sodium magnesium fluoride obtained in the step (c).

3. The process of claim 1, wherein said aqueous magnesium salt solution is added to said aqueous sodium fluoride solution.

4. The process of claim 1, wherein the concentration of sodium magnesium fluoride formed in step (a) is 0.1–5.0 wt. %, as $NaF \cdot MgF_2$.

5. The process of claim 1, wherein the concentration of sodium magnesium fluoride formed in step (a) is 0.2–2 wt. %, as $NaF \cdot MgF_2$.

6. The process of claim 1, wherein step (b) is carried out by membrane filtration employing an ultrafiltration membrane.

7. A process for producing a fine powder of sodium magnesium fluoride, which comprises the steps (a), (b), (c), and (d):

(a) a step of mixing an aqueous sodium fluoride solution and an aqueous magnesium salt solution in a Na/Mg molar ratio of 3.0 to form a slurry of aggregates of colloidal particles of sodium magnesium fluoride, (b) a step of removing by-product salts contained in the slurry of aggregates of colloidal particles of sodium magnesium fluoride obtained in the step (a), (c) a step of wet pulverizing the slurry of aggregates of colloidal particles of sodium magnesium fluoride obtained in step (b), thereby forming a sol comprising colloidal particles of sodium magnesium fluoride ($NaF.MgF_2$) having as average particle diameter from 10–100 nm, (d) a step of drying the aqueous sol of sodium magnesium fluoride obtained in the step.

8. The process of claim 7, wherein said aqueous magnesium salt solution is added to said aqueous sodium fluoride solution.

9. The process of claim 7, wherein the concentration of sodium magnesium fluoride formed in step (a) is 0.1–5.0 wt. %, as $NaF.MgF_2$.

10. The process of claim 7, wherein the concentration of sodium magnesium fluoride formed in Step (a) is 0.2–2 wt. %, as $NaF.MgF_2$.

11. The process of claim 7, wherein step (b) is carried out by membrane filtration employing an ultrafiltration membrane.

12. A process for producing an organo sol of sodium magnesium fluoride, which comprises the steps (a), (b) and (f):

(a) a step of mixing an aqueous sodium fluoride solution and an aqueous magnesium salt solution in a Na/Mg molar ratio of 3.0 to form a slurry of aggregates of colloidal particles of sodium magnesium fluoride, (b) a step of removing by-product salts contained in the slurry of aggregates of colloidal particles of sodium magnesium fluoride obtained in the step (a), and (f) a step of drying the slurry of aggregates of colloidal particles of sodium magnesium fluoride obtained in the step (b), dispersing tie dried product in an organic solvent, followed by wet-pulverization;

thereby forming a sol comprising colloidal particles of sodium magnesium fluoride ($NaF.MgF_2$) having an average particle diameter of from 10 to 100 nm.

* * * * *